3,816,465
PROCESS FOR PREPARING 2-SUBSTITUTED-3,4-DIHYDRO-2H-PYRANS

Yoshiharu Morita, Ryoji Kikumoto, Hiroshi Ohba, and Akio Nakamura, Yokohama, Kaoru Fukuda, Sagamihara, and Tatsuo Nomura, Yokohama, Japan, assignors to Mitsubishi Chemical Industries Ltd., Tokyo, Japan
No Drawing. Filed Dec. 29, 1971, Ser. No. 213,715
Int. Cl. C07d 7/10
U.S. Cl. 260—345.1    12 Claims

ABSTRACT OF THE DISCLOSURE 2-substituted-3,4-dihydro-2H-pyrans are prepared by reacting an $\alpha,\beta$-unsaturated carbonyl compound with a vinyl ether in the presence of a catalytic amount of a salt of zinc, aluminum, copper or chromium, preferably the halide or nitride salts, or zirconium oxyhalide, oxynitrate or oxyacetate, or tungstic acid.

BACKGROUND OF THE INVENTION

Field of the invention

This invention relates to a process for preparing 2-substituted-3,4-dihydro-2H-pyrans. More particularly, this invention relates to an improved process for preparing the same by reacting an $\alpha,\beta$-unsaturated carbonyl compound with a vinyl ether.

Description of prior art

2 - substituted - 3,4 - dihydro-2H-pyrans (hereinafter referred to as 2-SDHP) have been prepared in the prior art by reacting an $\alpha,\beta$-unsaturated carbonyl compound with a vinyl ether by heating at high temperatures.
The reaction proceeds as;

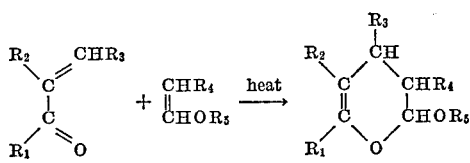

wherein $R_1$, $R_2$, $R_3$ and $R_4$ may each be same or different and each may represent hydrogen or a hydrocarbon residual group, e.g., an alkyl group or an aryl group, which can have an inert substitutent. Any two of the R's can be joined into an appropriate ring structure. $R_5$ represents a hydrocarbon residual group, e.g., an alkyl group or aryl group, which can have an inert substituent.

One of the difficulties with the prior art reaction is that the reaction velocity is quite low, thereby necessitating reaction at the elevated temperatures for extended periods of time. At these temperatures however, there is a significant danger of polymerization which can reduce the ultimate yield.

A need exists therefore, for a catalyst which can increase the reaction velocity and can enable the use of lower reaction temperatures.

SUMMARY OF THE INVENTION

Accordingly, it is an object of this invention to provide a commercially advantageous process for preparing 2-SDHP.

This object can be attained by reacting an $\alpha,\beta$-unsaturated carbonyl compound with a vinyl ether in the presence of a catalytic amount of a salt of zinc, aluminum, copper, chromium, or zirconium or tungstic acid.

DETAILED DESCRIPTION OF THE PREFERRED EMBODIMENTS

The $\alpha,\beta$-unsaturated carbonyl compounds used as a reactant in this process may be an $\alpha,\beta$-unsaturated aldehyde type compound such as acrolein, methacrolein, crotonaldehyde, cinnamic aldehyde, 2-methylene cyclohexanone, 2-methyl-6-methylene cyclohexanone and $\alpha$-methyl-$\beta$-phenyl-acrolein, etc.

The vinyl ether reactant used herein may be a lower alkyl vinyl ether, such as methyl vinyl ether, ethyl vinyl ether, butyl vinyl ether, ethyl propenyl ether, 2-ethylhexyl vinyl ether; or cyclic unsaturated ethers, such as phenyl phenyl vinyl ether, methyl cyclohexenyl ether, 3,4-dihydro-2H-pyran, etc. The reactants can be present in equimolar amounts however, since the $\alpha,\beta$-unsaturated carbonyl compounds are more polymerizable than the vinyl ethers, it is preferable to use an excess amount of the vinyl ethers.

The catalyst used in the process is a salt of zinc, aluminum, copper, chromium or zirconium, or tungstic acid, or mixtures thereof.

It is preferable to use a halide or nitrate of zinc, aluminum, copper, or chromium, or to use zirconium in the form of an oxyhalide, oxynitrate or oxyacetate.

Suitable catalysts include zinc chloride, zinc bromide, zinc, iodide, zinc nitrate, aluminum chloride, aluminum bromide, aluminum nitrate, zirconium oxychloride, zirconyl acetate, zirconyl nitrate, chromium chloride, cuprous chloride, cupric chloride, or tungstic acid.

Where a zinc salt is used as the catalyst, the highest conversion and selectivity in the reaction, can be obtained. Accordingly, it is especially preferable to use a zinc salt.

The catalyst should be used in catalytic amounts depending upon the reaction conditions, and is preferably in the range of 0.1–100 millimoles, particularly 0.3–30 millimoles per mole of $\alpha,\beta$-unsaturated carbonyl compound.

Where too much catalyst is used, polymerization may occur in competition with the desired reaction.

This reaction can be easily conducted by admixing the $\alpha,\beta$-unsaturated carbonyl compound with the vinyl ether in the presence or absence of a solvent and in the presence of the catalyst.

Suitable solvents include benzene, toluene, heptane, cyclohexane, ethers and esters, etc.

The reaction is usually conducted at 0° C.–200° C., preferably 40° C.–130° C. and the period of reaction will depend upon the starting materials and the particular reaction temperature. Good results are attainable with a period of 20 minutes to 4 hours.

Since the starting materials and the resulting product of this reaction are easily polymerizable, it is desirable to effect the reaction at lower temperatures and short reaction periods. If desired, to further control polymerization, a polymerization inhibitor, such as hydroquinone, etc., may be added to the reaction system.

The pressure of the reaction can be varied depending upon the reacting conditions. Where the boiling point of the starting material, especially the vinyl ether is too low, it is preferable to maintain the liquid phase by increasing the pressure with an inert gas to maintain liquid phase conditions.

Some of the above-mentioned catalysts are soluble in the reaction system and the others are insoluble in the reaction system. Accordingly, it is possible to conduct the reaction of this invention in a homogeneous system or in a heterogeneous system. Homogeneous reaction systems in general provide superior results.

The catalysts used herein make possible a very high reaction velocity, at relatively low temperatures, as compared with the conventional processes, so that the 2-

SDHP can be prepared, with industrial advantage, without effecting a competing polymerization side-reaction.

Where a zinc salt is used as the catalyst, 2-SDHP may be produced in high yields by effecting the reaction at relatively low temperatures and in short periods of time.

Having generally described the invention, a more complete understanding can be attained by reference to certain specific examples, which are included herein for purposes of illustration only and are not intended to be limiting unless otherwise specified.

EXAMPLE 1

In a 100 cc. autoclave, 11.4 g. of 98% purity acrolein containing 0.2 wt. percent of polymerization inhibitor, 29.1 g. (0.5 mole) of methyl vinyl ether and 0.07 g. of zinc chloride were charged, and the mixture was heated to 90° C. for about 15 minutes while stirring. The mixture was cooled to yield a reaction product.

The reaction product was a colorless liquid and did not contain unreacted acrolein according to gas chromatography analysis. The conversion of acrolein was substantially 100%. The reaction product was washed with 20 cc. of water and was separated and distilled, to obtain an unreacted methyl vinyl ether fraction. 21.7 g. (0.19 mole) of 2-methoxy-3,4-dihydro-2H-pyran was obtained as a 127° C. fraction. The yield of the product calculated from the acrolein, was 95%.

EXAMPLE 2

The reaction of Example 1 was repeated except varying the reaction conditions as follows.

The reaction product was analyzed by gas-chromatography to determine the yield of 2-methoxy-3,4-dihydro-2H-pyran.

| Acrolein amount (mole) | Methyl vinyl ether amount (mole) | Catalyst amount (g.) | Reaction Temp. (° C.) | Time (min.) | Yield (percent) |
|---|---|---|---|---|---|
| 0.2 | 0.5 | ZnCl$_2$, 0.55 | 30 | 60 | 88 |
| 0.2 | 0.5 | ZnCl$_2$, 0.14 | 70 | 30 | 92 |
| 0.2 | 0.5 | Zn(NO$_3$)$_2$·6H$_2$O, 0.15 | 90 | 30 | 76 |
| 0.2 | 0.5 | ZnBr$_2$, 0.11 | 90 | 30 | 82 |
| 0.2 | 0.5 | ZnI$_2$, 0.16 | 90 | 30 | 78 |
| 0.2 | 0.24 | ZnCl$_2$, 0.03 | 130 | 20 | 83 |

EXAMPLE 3

The reaction of Example 1 was repeated except that the amounts of the catalyst, reaction temperature and reaction time were varied in reaction of acrolein and an equimolar amount of vinyl ether. The yields of the reaction products are shown in the following Table.

The reaction product was 2-ethoxy-3,4-dihydro-2H-pyran where ethylvinylether was used. The reaction product was 2-n-butoxy-3,4-dihydro-2H-pyran where n-butyl vinyl ether was used.

| Vinyl ether | Catalyst | Cat. amount[1] | Reaction Temp. (° C.) | Time (min.) | Yield (percent) |
|---|---|---|---|---|---|
| Ethyl vinyl ether | ZnBr$_2$ | 15.0 | 40-50 | 40 | 92.5 |
| Do | ZnI$_2$ | 3.8 | 43-50 | 120 | 89.0 |
| Do | Zn(NO$_3$)$_2$·6H$_2$O | 1.6 | 43-53 | 140 | 86.0 |
| n-Butyl vinyl ether | ZnCl$_2$ | 7.0 | 60 | 20 | 81.0 |
| Ethyl vinyl ether | AlCl$_3$ | 5.9 | 43-53 | 240 | 40.0 |

[1] Mmole of catalyst to 1 mole of acrolein.

EXAMPLE 4

17.1 g. of acrolein was reacted with 21.0 g. of methyl vinyl ether, using similar conditions as in Example 1. The results are shown in the following Table.

| Catalyst | Amount (g.) | Reaction Temp. (° C.) | Time (min.) | Conversion | Selectivity | Yield |
|---|---|---|---|---|---|---|
| ZrOCl$_2$ | 1.0 | 50 | 60 | 66 | 91 | 60 |
| ZrO(OCOCH$_3$)$_2$ | 0.7 | 70 | 180 | 63 | 90 | 57 |
| ZrO(NO$_3$)$_2$·2H$_2$O | 0.8 | 100 | 60 | 49 | 87 | 43 |
| CrCl$_3$ | 0.5 | 80 | 120 | 46 | 85 | 39 |
| CuCl | 0.3 | 80 | 120 | 34 | 88 | 30 |
| H$_2$WO$_4$ | 0.8 | 80 | 120 | 37 | 89 | 33 |
| No catalyst | (a) | 50 | 60 | 0.2 | 85 | 0.2 |
| Do | (a) | 100 | 60 | 3.7 | 82 | 3.0 | a Reference using no catalyst (conventional process).

EXAMPLE 5

Crotonaldehyde was admixed with a catalyst of Zn(NO$_3$)$_2$·6H$_2$O (8.0 millimoles of catalyst to 1 mole of aldehyde) and an equimolar amount of ethyl vinyl ether. The mixture was reacted at 70° C. for 2 hours. The yield of 2-ethoxy-3,4-dihydro-4-methyl-2H-pyran was 68.0%.

Having now fully described the invention, it will be apparent to one of ordinary skill in the art that many changes and modifications can be made thereto without departing from the spirit or scope of the invention.

What is claimed as new and desired to be secured by Letters Patent of the United States is:

1. In a process for preparing 2-substituted-3,4-dihydro-2H-pyrans of the formula:

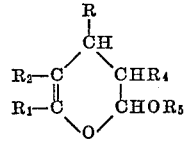

wherein $R_1$, $R_2$, $R_3$ and $R_4$ are hydrogen, lower alkyl or a phenyl group and $R_5$ is a lower alkyl or a phenyl group, which process comprises reacting an $\alpha,\beta$-unsaturated carbonyl compound of the formula:

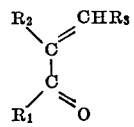

wherein $R_1$, $R_2$ and $R_3$ are either hydrogen, a lower alkyl or a phenyl group, with a vinyl ether of the formula:

wherein $R_4$ is hydrogen, a lower alkyl or a phenyl group and $R_5$ is a lower alkyl or a phenyl group, wherein the improvement comprises effecting the reaction in the presence of at least one catalyst selected from the group consisting of zinc, aluminum, copper, chromium, zirconium and tungstinic acid.

2. The process according to claim 1, wherein the catalyst is a zinc salt.

3. The process according to claim 1, wherein 0.1–100 millimoles of the catalyst per mole of the $\alpha,\beta$-unsaturated carbonyl compound is used.

4. The process according to claim 1, wherein the $\alpha,\beta$-unsaturated carbonyl compound is reacted with the vinyl ether at 0–200° C.

5. The process according to claim 1, wherein a polymerization inhibitor is added in the reaction system.

6. The process according to claim 1, wherein the $\alpha,\beta$-unsaturated carbonyl compound is $\alpha,\beta$-unsaturated aldehyde selected from the group consisting of acrolein and methacrolein, and the vinyl ether is selected from the group consisting of methyl vinyl ether, ethyl vinyl ether and butyl vinyl ether.

7. The process according to claim 1, wherein the $\alpha,\beta$-unsaturated carbonyl compound is reacted with the vinyl ether in the presence of at least one catalyst selected from the group consisting of zinc halide, zinc nitrate, aluminum halide, aluminum nitrate, zirconium oxyhalide, zirconium oxyacetate, zirconium oxynitrate, cuprous halide, cupric halide, chromium halide and tungstic acid.

8. The process according to claim 7, wherein the catalyst is selected from the group consisting of zinc halide and zinc nitrate.

9. The process according to claim 7, wherein 0.1–100 millimoles of the catalyst per mole of the $\alpha,\beta$-unsaturated carbonyl compound is used.

10. The process according to claim 7, wherein the $\alpha,\beta$-unsaturated carbonyl compound is reacted with the vinyl ether at 0–200° C.

11. The process according to claim 7, wherein a polymerization inhibitor is used in the reaction system.

12. The process according to claim 1, wherein the $\alpha,\beta$-unsaturated carbonyl compound is selected from the group consisting of acrolein and methacrolein and the vinyl ether is selected from the group consisting of methyl vinyl ether, ethyl vinyl ether and butyl vinyl ether.

References Cited
UNITED STATES PATENTS 3,162,652  12/1964  Boswell _____ 260—345.1

JOHN M. FORD, Primary Examiner